Feb. 24, 1959     B. J. KAYSER, JR     2,875,430
ALARM APPARATUS FOR MOTOR VEHICLE OPERATOR
Filed Dec. 17, 1957
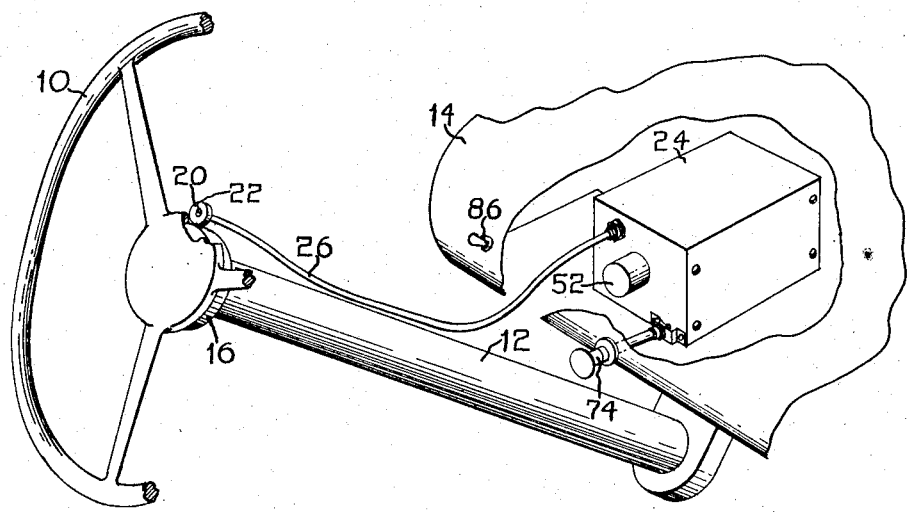
FIG.1
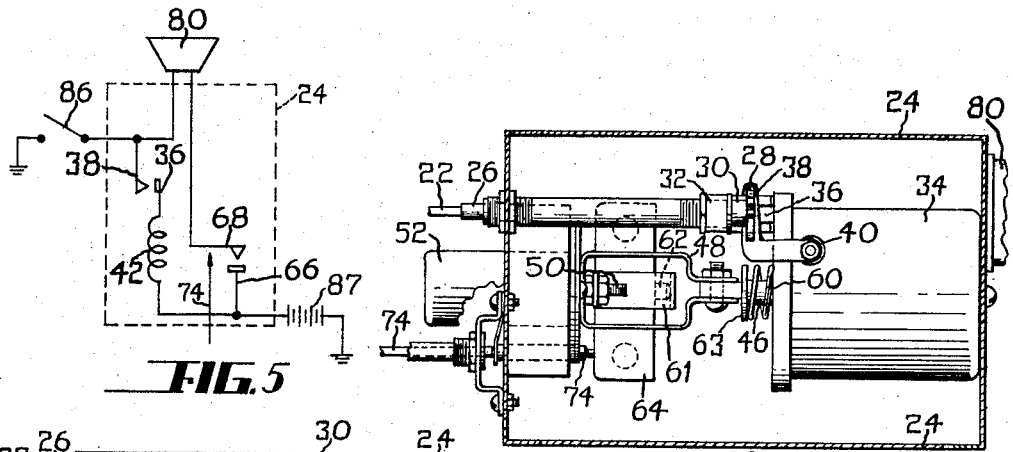
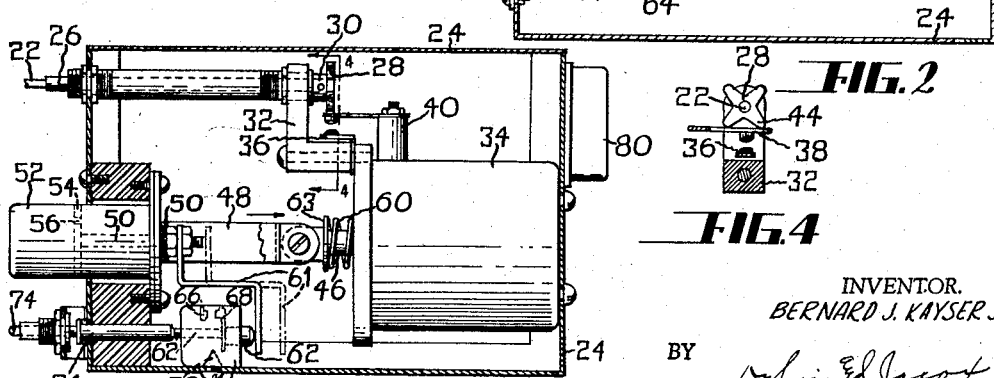
INVENTOR.
BERNARD J. KAYSER JR.
BY
Dybvig & Jacot
HIS ATTORNEYS

United States Patent Office 2,875,430
Patented Feb. 24, 1959

2,875,430

ALARM APPARATUS FOR MOTOR VEHICLE OPERATOR

Bernard J. Kayser, Jr., Delphos, Ohio

Application December 17, 1957, Serial No. 703,377

12 Claims. (Cl. 340—279)

This invention relates to alarm apparatus for the operator of a motor vehicle. The invention relates more particularly to alarm apparatus for indicating lack of alertness of an operator of a motor vehicle.

An object of this invention is to provide apparatus which automatically provides an alarm to the operator of a motor vehicle if the operator momentarily lacks the necessary alertness to properly operate the motor vehicle.

Another object of this invention is to provide such an alarm apparatus which may be easily and readily installed in any motor vehicle such as an automobile, truck, or the like.

It has been learned that the operator of a motor vehicle may continue to retain a firm grasp upon the steering wheel of the motor vehicle even when the operator lacks the necessary alertness to properly operate the motor vehicle. Thus, another object of this invention is to provide an alarm apparatus which indicates lack of alertness of the operator of a motor vehicle even though the operator's manual grasp upon the steering wheel of the vehicle remains firm.

Another object of this invention is to provide such an alarm apparatus which is accurate and dependable in operation.

Another object of this invention is to provide such an alarm apparatus which may be built at low cost and which is durable and long lived.

Other objects and advantages reside in the construction of parts, the combination thereof, the method of manufacture, and the mode of operation, as will become more apparent from the following description.

It is well known that during the operation of a motor vehicle along any street, highway, or road, the operator of the motor vehicle rotatably moves the steering wheel, at least a few degrees, every few seconds. It has been found that an alert operator of a motor vehicle rotatably moves the steering wheel of the motor vehicle, at least a few degrees, and at least one time every two or three seconds. If the operator of the motor vehicle, for any reason such as drowsiness, or the like, lacks the necessary alertness to properly operate the motor vehicle, the operator fails to rotatably move the steering wheel of the vehicle within the period of two or three seconds.

This invention provides means by which an alarm is given if the operator of a motor vehicle fails to rotatably move the steering wheel of the motor vehicle within a period of two or three seconds. Of course, the apparatus of this invention is adjustable to operate within an interval of time slightly more or less than two or three seconds, if such is deemed advisable. The apparatus of this invention is thus capable of providing an alarm if the driver of a motor vehicle lacks alertness for any given short interval of time.

In the drawing, Figure 1 is a perspective view with parts broken away showing an alarm apparatus of this invention operably connected to the steering mechanism of a motor vehicle.

Figure 2 is an enlarged top view, with parts shown in section, of a portion of an alarm apparatus of this invention.

Figure 3 is a side sectional view, with parts broken away, of the portion of the alarm apparatus shown in Figure 2.

Figure 4 is a sectional view taken substantially on line 4—4 of Figure 3.

Figure 5 is a diagrammatic wiring diagram of the electric circuits of an alarm apparatus of this invention.

Referring to the drawing in detail, Figure 1 shows a steering mechanism of a motor vehicle which includes a steering wheel 10, shown supported by a steering column 12. The motor vehicle is also shown as being provided with a panel or dashboard 14.

The steering wheel 10 is provided with any suitable cylindrical hub 16. A roller 20 is in engagement with the hub 16 and is rotatable therewith. The roller 20 is attached to any suitable drive shaft. Herein the roller 20 is attached to a flexible drive shaft 22 which may extend along the steering column 12. The roller 20 is held in engagement with the hub 16 by means of any suitable clamp (not shown) attached to the steering column 12.

A housing 24 is attached by any suitable means under the panel or dashboard 14. The drive shaft 22 extends within a tube 26 from the roller 20 to the housing 24. The drive shaft 22 also extends to a position within the housing 24 and is attached to a cam 28 which is rotatably supported by a holder 30. The cam 28 is thus rotatable with the roller 20.

A bracket 32 joins the holder 30 to an actuator 34 which is attached to the housing 24. The bracket 32 and the actuator 34 retain a stationary contact stem 36, best shown in Figure 3. The actuator 34 also supports a movable contact stem 38 which is attached to a post 40, as shown in Figures 3 and 4.

The cam 28 is provided with a plurality of fingers or protuberances 44, as shown in Figure 4. As the cam 28 rotates, the fingers or protuberances 44 urge the movable contact stem 38 into engagement with the stationary contact stem 36. Within the actuator 34 is a conventional electric coil 42, shown in Figure 5, provided with a reciprocally operable armature or actuator rod 46, shown in Figures 2 and 3. The armature 46 extends from the actuator 34 and is movable inwardly by the coil 42. Thus, the actuator 34 may comprise a device commonly referred to as a solenoid.

The actuator rod 46 of the actuator 34 is connected by means of a rigid link 48 to an operator rod or timer rod 50 of a timer mechanism or timer device 52. The timer mechanism 52 is of the dash-pot type and is provided with a piston 54 attached to the rod 50. The piston 54 is provided with an orifice 56 therethrough. The timer mechanism 52 is closed at the left-hand end thereof as viewed in Figures 2 and 3. However, the mechanism 52 is open to the atmosphere at the right-hand end thereof. Thus, as the piston 54 is forced toward the left, air is compressed within the left-hand portion of the timer mechanism 52 and the compressed air moves from the left-hand side of the piston 54 to the right-hand side thereof through the orifice 56.

A helical spring 60 is compressed between the actuator 34 and a collar 63 of the rod 46. The helical spring 60 urges the rods 46 and 50 with the link 48 to the left, as viewed in Figures 2 and 3. Thus, the spring 60 urges the piston 54 to move to the left, compressing air within the timer device 52. Thus, the spring 60 operates the timer device 52. According to a well known principle, this flow of air through the orifice 56 from the left-hand side of the piston 54 to the right-hand side thereof, requires a certain amount of time as the spring 60 forces the piston 54 to its extreme left-hand position. Thus, the piston 54 is limited to comparatively slow movement from the right-hand portion of the timer 52 to the left-hand portion thereof. The timer device 52 operates through a given interval of time; the timer mechanism 52 is set at "zero" time when the piston 54 is at its extreme right-hand position.

An arm 61 is attached to the rod 50 and is reciprocally movable therewith. The arm 61 engages a plunger 62 of a switch mechanism 64, which is attached to the housing 24 as shown in Figure 3. The switch mechanism 64 includes a stationary contact stem 66 and a movable contact stem 68. The movable contact stem 68 is attached to the plunger 62 and is movable therewith. The switch mechanism 64 also includes a resilient and tapered latch member 70 which is engaged by the movable contact stem 68 as the movable contact stem 68 moves toward the stationary contact stem 66. As the movable contact stem 68 engages the stationary contact stem 66, the movable contact stem 68 moves past the apex of the resilient latch 70 and is retained by the latch 70 in engagement with the stationary contact stem 66.

A reset rod 74 is held by the housing 24 in alignment with the plunger 62. The reset rod 74 is engageable with an extending end of the plunger 62 so that the reset rod 74 may be axially moved toward the switch mechanism 64, moving the plunger 62 so that the movable contact stem 68 is moved out of engagement with the stationary contact stem 66. In moving from engagement with the stationary contact stem 66, the movable contact stem 68 again is forced past the resilient latch 70.

An alarm 80 is shown supported by the housing 24 and is connected by suitable electrical conductors to the movable contact stem 68 and to the stationary contact stem 66, as shown in Figure 5. Also shown in Figure 5 are suitable conductor members which join the contact stems 36 and 38 to the coil 42 of the actuator 34. A suitable switch 86 is used to energize the electric circuit of the alarm apparatus. Any suitable source of energy such as a battery 87, shown in Figure 5, may be used to energize the circuits of the apparatus. This battery 87 may be the usual storage battery in the vehicle.

*Operation*

As stated above, during normal operation of a motor vehicle, the operator thereof moves the steering wheel at least a few degrees at least once every two or three seconds. Therefore, during normal operation the roller 20 which is in engagement with the hub 16 is caused to rotatably move at least every two or three seconds. It should be noted that the diameter of the roller 20 is considerably smaller than the diameter of the hub 16. Therefore, with only slight movement of the hub 16, the roller 20 may rotate a considerable amount. Thus, the cam 28 is rotated considerably with only a small amount of rotative movement of the steering wheel 10. Therefore, during normal operation the movable contact stem 38 is caused to move into engagement with the stationary contact stem 36 at least once or twice every two or three seconds as the fingers or protuberances 44 engage the movable contact stem 38 during rotation of the cam 28.

Upon each engagement of the contact stem 38 with the contact stem 36, the coil 42 within the actuator 34 is energized. This energization draws the actuator rod 46 in a direction toward the actuator 34.

As discussed above, the spring 60 continuously urges the piston 54 within the timer mechanism 52 slowly toward the left. Upon each actuation of the actuator 34, as the contact stems 38 and 36 close, the actuator 34 draws the piston 54 to its extreme right-hand position within the timer mechanism 52. Such movement by the actuator 34 resets the timer mechanism to its zero time position.

When the steering wheel 10 is not being rotatably moved, the resiliency of the contact stem 38 forces the cam 28 to position itself as shown in Figure 4 so that the contact stems 38 and 36 are out of engagement. However, with only a very slight rotation of the steering wheel 10 the cam 28 again causes closing of the contact stems 38 and 36 so that the actuator 34 again resets the timer mechanism 52 to its zero time position. Immediately following the reset operation by the actuator 34, the spring 60 again begins operation of the timer mechanism 52 by moving the piston 54, from its zero time position, slowly to the left.

If the steering wheel 10 remains in any given position, the cam 28 remains in the position shown in Figure 4. Thus, the contact stems 38 and 36 are disengaged. If this condition remains for a sufficient period of time, the spring 60 is permitted to force the piston 54 a considerable distance within the timer mechanism 52. Due to the fact that the arm 61 moves with the timer rod 50, sufficient movement of the timer rod 50 causes engagement of the arm 61 with the plunger 62, as shown in Figure 3.

Upon further movement of the piston 54 toward the left within the timer mechanism 52, the arm 61 moves the plunger 62 so that the contact stem 68 engages the resilient latch 70. Further movement of the arm 61 causes the contact stem 68 to move past the latch 70 so that the contact stem 68 engages the stationary contact 66. Thus, when the contact stem 68 is in engagement with the contact 66, the lower portion of the contact stem 68 is to the left of the resilient latch 70, so that the latch 70 holds the movable contact stem 68 in engagement with the stationary contact 66. When the contact stems 66 and 68 are in engagement, the alarm 80 is energized, as is readily understood from the circuit diagram shown in Figure 5. The alarm 80 remains energized until the reset rod 74 is manually operated to force the plunger 62 to the right, as shown in Figure 3, so that the movable contact stem 68 is forced past the resilient latch 70 as the contact stem 68 separates from the contact 66 or until the switch 86 is opened to deenergize the entire device.

It is to be understood that the alarm 80 may be any suitable indicator member. The alarm 80 may be an audible indicator and/or a visible indicator. The alarm 80 may be any other suitable means for alarming or alerting the operator of the motor vehicle. Thus, it is understood that during the operation of the motor vehicle the alarm 80 is deenergized if the steering wheel 10 is rotatably moved at least a small amount during every short interval of time. This short interval of time is usually selected as being in the order of one to three seconds. It is to be understood that this interval of time may be adjusted by changing the size of the orifice 56 or by changing the size of the spring 60.

Thus, it is understood that the alarm apparatus of this invention provides means by which an operator of a motor vehicle automatically receives an indication that he has momentarily lost the necessary alertness for proper operation of the motor vehicle.

When traveling in heavy traffic or during any other traveling when it is necessary to make frequent stops, the switch 86 may be opened to prevent energization of the alarm 80.

Instead of the cam 28 and the contact stems 36 and 38 being located in the housing 24, the cam 28 and the contact stems 36 and 38 could be mounted in the immediate vicinity of the steering column 12, so as to eliminate the flexible drive shaft 22. The cam 28 would then be driven directly by the roller 20, possibly through a short stubshaft. By this arrangement, it would be merely necessary to provide leads from the steering column 12 to the actuator 34, which, in this case, happens to be an electromagnet or solenoid.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. Apparatus for alerting the operator of a motor vehicle in control of the steering mechanism thereof, the combination comprising detector means indicating operation of the steering mechanism, timer means, alarm means operable by the timer means, the timer means being adjustable to a zero time position, the timer means being operable from the zero time position to cause actuation of the alarm means after a given interval of time, and reset means operable by the detector means and connected to the timer means, the reset means adjusting the timer means to its zero time position upon each operation of the steering mechanism.

2. Mechanism for a motor vehicle to detect lack of alertness of the operator comprising transmitter means operably connected to the steering wheel of the vehicle, the transmitter means having a portion thereof at a position in spaced relation from the steering wheel, a cam attached to the transmitter means and operable thereby, the cam being disposed at said portion of the transmitter means, switch means in engagement with the cam and operable thereby, actuator means operably connected to the switch means for control thereby, timer means connected to the actuator means, the timer means operating toward a given time position, the actuator means being operable in direct opposition to the timer means so that the operating position of the timer means is adjusted away from said given time position by operation of the actuator means, and alarm means operably connected to the timer means and operable by the timer means at said given time position.

3. Mechanism for detecting lack of alertness of an operator of a vehicle in control of the steering wheel thereof comprising a roller member in engagement with a portion of the steering wheel and rotatable therewith, a drive shaft attached to the roller member at one end thereof and rotatable therewith, a cam attached to the other end of the drive shaft and rotatable therewith, an electric switch mechanism in engagement with the cam and operable thereby with rotation thereof, a solenoid electrically connected to the switch mechanism for control thereof, the solenoid having a reciprocally operable rod extending therefrom, a reciprocally operable timer member attached to the rod, the timer member moving the rod in one direction during operation thereby, the solenoid moving the rod in the opposite direction during operation thereby, and an indicator member operable by the timer member after sufficient continuous movement of the rod by the timer member.

4. Apparatus for maintaining alertness of an operator of steering mechanism of a motor vehicle, the combination comprising detector means detecting operation of the steering mechanism within a given interval of time, alarm means connected to the detector means causing an alarm if the steering mechanism is not operated within the given interval of time.

5. Apparatus for indicating lack of alertness of the operator of a vehicle provided with steering mechanism, the combination comprising control means connected to the steering mechanism and operable thereby, actuator means connected to the control means and controlled thereby, timer means attached to the actuator means, the timer means being operable from a lesser time position to a greater time position, switch means connected to the timer means and operable thereby as the timer means reaches its greater time position, the actuator means operating the timer means toward the lesser time position upon each operation of the actuator means, the timer means thus causing operation of the switch means when the actuator means does not operate during the operation of the timer means from the lesser time position to the greater time position, and alarm means connected to the switch means and controlled thereby.

6. Mechanism for alerting the operator of a vehicle provided with steering mechanism, the combination comprising control means connected to the steering mechanism and operable thereby, actuator means connected to the control means and controlled thereby, timer means attached to the actuator means, the timer means being operable from a first position to a second position, alarm means operably connected to the timer means, the alarm means being operable by the timer means at the second position of the timer means, the actuator means operating the timer means toward the first position upon each operation of the actuator means, the timer means thus causing operation of the alarm means when the actuator means does not operate during the operation of the timer means from the first position to the second position.

7. In combination with a motor vehicle having steering apparatus, a mechanism for indicating lack of alertness of the operator of the steering apparatus including timer means operable from a zero time position to a predetermined time position, actuator means attached to the timer means and operable to adjust the timer means toward its zero time position, control means operably connected to the steering apparatus detecting operation thereof, the control means also being connected to the actuator means and controlling operation thereof, indicator means connected to the timer means and operable thereby at the predetermined time position of the timer means.

8. In combination with a steering mechanism, a detector including a dash-pot having a closed end and an open end provided with a piston having an orifice therethrough, spring means urging movement of the piston toward the closed end of the dash-pot, actuator means attached to the piston and operable to move the piston toward the open end of the dash-pot, an arm member operably connected to the piston and movable therewith, a switch member operable by the arm member upon movement of the piston to a predetermined position toward the closed end of the dash-pot, an indicator member connected to the switch member, and transfer means connecting the steering mechanism to the actuator means for operation thereof upon operation of the steering mechanism.

9. Apparatus for detecting lack of alertness of the operator of a steering wheel of a motor vehicle comprising a roller rotatable with the steering wheel, a drive shaft having one end thereof attached to the roller for rotation of the shaft with the roller, a cam attached to the other end of the drive shaft for rotation therewith, an electric switch adjacent the cam and operable thereby, an electromagnet connected to the switch for controlled operation thereby, the electromagnet including a reciprocally operable actuator rod extending therefrom, a dash-pot timer mechanism, the dash-pot timer mechanism including a cylinder having an open end facing the actuator rod, the cylinder being closed at the opposite end thereof, a piston within the cylinder and movable intermediate the ends thereof, the piston having an orifice therethrough, the piston being connected to the actuator rod and reciprocally movable therewith, a spring urging the piston toward the closed end of the cylinder, an arm attached to the actuator rod and movable therewith, a control member adjacent the arm and operable thereby upon movement of the piston to a given position toward the closed end of the cylinder, and an indicator connected to the control member.

10. A signalling device for creating a signal when the driver of a motor vehicle fails to actuate the steering device for a period of time including an electromagnet, a dash-pot, said dash-pot having an apertured piston and a spring urging the piston in a given direction, means connecting the dash-pot to the electromagnet, the electromagnet moving the piston in a direction opposite said given direction, an electric switch, means operatively connecting the dash-pot and the switch so that the switch is closed as the piston moves for a predetermined period of time in the given direction, a signalling device connected in series to the switch, a source of electrical energy connected to said switch and to said electromagnet, a control member connected in series with the electromagnet, means including the control member responsive to the movement of the steering device for energizing said electromagnet.

11. Signal apparatus for alerting the operator of a motor vehicle in control of the steering mechanism thereof comprising timer means having means urging continuous operation thereof, the timer means having a zero time position, means connected to the timer means and responsive to operation of the steering mechanism adjusting the timer means toward its zero time position upon each operation of the steering mechanism, and indicator means operably connected to the timer means and responsive to operation of the timer means after the timer means has operated for a predetermined continuous period of time.

12. Apparatus for maintaining alertness of the driver of a motor vehicle in control of a steering wheel thereof comprising alarm means, control means for operation of the alarm means, the control means including time delay means operable to energize the alarm means after a time delay period in the order of two to three seconds, the time delay means being adjustable to a zero time position at any time during the time delay period, and actuator means operably connected to the time delay means and to the steering wheel, the actuator means adjusting the time delay means to its zero position upon each operation of the steering wheel.

No references cited.